United States Patent [19]

Yamatani

[11] Patent Number: 5,247,496
[45] Date of Patent: Sep. 21, 1993

[54] RECORDING AND/OR REPRODUCING APPARATUS FOR USING MAGNETO-OPTICAL DISC

[75] Inventor: Wataru Yamatani, Chiba, Japan

[73] Assignee: Sony Corporation, Tokyo, Japan

[21] Appl. No.: 988,029

[22] Filed: Dec. 9, 1992

Related U.S. Application Data

[63] Continuation of Ser. No. 690,597, Apr. 24, 1991, abandoned.

[30] Foreign Application Priority Data

Apr. 28, 1990 [JP] Japan .................................. 2-112557

[51] Int. Cl.⁵ .................. G11B 13/04; G11B 11/12; G11B 11/10
[52] U.S. Cl. ............................ 369/13; 369/75.2; 369/270; 360/114
[58] Field of Search ............... 369/13, 14, 75.2, 270; 360/114, 59, 66, 60

[56] References Cited

U.S. PATENT DOCUMENTS

| | | | |
|---|---|---|---|
| 5,022,018 | 6/1991 | Vogelgesang | 360/59 |
| 5,027,334 | 6/1991 | Yamanaka et al. | 360/59 |
| 5,034,933 | 7/1991 | Fujisawa et al. | 369/13 |

FOREIGN PATENT DOCUMENTS

| | | | |
|---|---|---|---|
| 0387047 | 9/1990 | European Pat. Off. | 369/13 |
| 0387047A2 | 9/1990 | European Pat. Off. | |
| 62-185269 | 8/1987 | Japan | 360/114 |
| 63-55704 | 3/1988 | Japan | 360/114 |

OTHER PUBLICATIONS

Patent Abstracts of Japan, vol. 13, No. 409 (P-931)(3757), 11 Sep. 1989 & JP-A-1 150 203 (Victor Company of Japan).
Patent Abstracts of Japan, vol. 10, No. 180 (0-471)(2236), 24 Jun. 1986 & JP-A-61 029 438 (Sony).

*Primary Examiner*—Hoa T. Nguyen
*Attorney, Agent, or Firm*—Philip M. Shaw, Jr.

[57] ABSTRACT

A magneto-optical disc recording and/or reproducing apparatus having an external magnetic field generating means for supplying an external magnetic field to a magneto-optical disc, a spacer sheet disposed relative to the magneto-optical disc at its surface side opposing to the external magnetic field generating means and a moving means for moving the external magnetic field generating means in the direction in which the external magnetic field generating means is isolated from and brought in contact with the magneto-optical disc, in which the moving means moves the external magnetic field generating means to the position at which the external magnetic field generating means comes in contact with the magneto-optical disc via the spacer sheet when an information signal is recorded on the magneto-optical disc, whereas the moving means moves the external magnetic field generating means to the position distant from the magneto-optical disc when the information signal recorded on the magneto-optical disc is reproduced.

5 Claims, 7 Drawing Sheets

RECORDING AND/OR REPRODUCING APPARATUS FOR USING MAGNETO-OPTICAL DISC

This is a continuation of co-pending application Ser. No. 07/690,597, filed on Apr. 24, 1991, now abandoned.

BACKGROUND OF THE INVENTION

1. Field of the Invention

The present invention generally relates to a magneto-optical disc recording and/or reproducing apparatus in which a signal is recorded on a magneto-optical disc by a so-called magnetic field modulation system. More particularly, this invention relates to a novel magneto-optical disc recording and/or reproducing apparatus in which, when a magneto-optical disc is chucked to a turntable, a spacer sheet is put on the magneto-optical disc at its side opposing an external, magnetic field generating coil, whereby upon playback the load on the revolution of the magneto-optical disc can be reduced, the consumed power can be reduced, the jitter caused by irregular revolution can be reduced and the service life of the external magnetic field generating coil and the spacer sheet can be prolonged.

2. Description of the Prior Art

A magneto-optical disc recording and/or reproducing apparatus has been proposed, in which a signal is recorded on a record medium by applying the heat energy of a laser beam and an external magnetic field to the record medium having a magnetic thin film which can be magnetized in a vertical magnetization mode and a recorded signal is read out from the record medium by detecting a reflected back light of a laser beam illuminated on the magnetic thin film owing the photomagnetic effect.

As a signal recording system for such a magneto-optical recording and/or reproducing apparatus, there have been developed a magnetic field modulation system in which a magnetic force of an external magnetic field is changed while the heat energy of a laser beam is kept constant and an optical modulation system in which heat energy of the laser beam is changed while the magnetic force of the external magnetic field is kept constant. It is to be noted that the magnetic modulation system is superior to the optical modulation system in that a so-called overwrite is possible wherein a recorded signal is erased and a new signal is recorded.

Incidentally, as the form of the record medium utilized by this kind of recording and/or reproducing apparatus, a disc-shaped record medium (hereinafter referred to as "magneto-optical disc") is known. When this magneto-optical disc is utilized, an optical pickup for illuminating the magneto-optical disc with a laser beam so as to form a beam spot and an external magnetic field generating coil for applying a magnetic field to the magneto-optical disc at its position corresponding to the beam spot are opposed to each other across the magneto-optical disc, and the optical pickup and the external magnetic field generating coil are unitarily moved in the radial direction of the magneto-optical disc.

Incidentally, since the magnetic force from a magnetic force generating source is in inverse proportion to the distance between it and the plane to which the magnetic force is applied, the distance between the external magnetic field generating coil and the magneto-optical disc must be kept constant so that the signal can be recorded stably by this kind of magneto-optical recording and/or reproducing apparatus.

However, if the magneto-optical disc is warped or if the axis of the rotation mechanism for the disc is inclined, there arises the problem such that the distance between the external magnetic field generating coil and the magneto-optical disc will be changed.

Accordingly, in order to keep the distance between the external magnetic field generating coil and the magneto-optical disc constant, it is proposed that the external magnetic field generating coil is brought in contact with the magneto-optical disc across a spacer sheet having an excellent slipping property. By way of example, a spacer sheet is secured at the central portion thereof to a chucking member which urges the central portion of the magneto-optical disc to a turntable, and when the magneto-optical disc is held between the turntable and the chucking member, the spacer sheet is brought in close contact with the magneto-optical disc at its surface opposing the external magnetic field generating coil and the external magnetic field generating coil comes in contact with the magneto-optical disc with a proper resilient force across the spacer sheet.

According to the above-mentioned proposal, even though the magneto-optical disc is warped and the axis of the turntable is inclined so that the magneto-optical disc is rotated while the surface thereof is vibrated, the distance between the external magnetic field generating coil and the magneto-optical disc can be constantly maintained the same as the thickness of the spacer sheet.

However, when the external magnetic field generating coil is brought in contact with the magneto-optical disc across the spacer sheet as described above, during the time that the magneto-optical disc is rotated, the external magnetic field generating coil exists as a load on the rotation of the magneto-optical disc constantly so that the load of the motor for rotating the magneto-optical disc is increased. As a consequence, the consumption of power is increased and the magneto-optical disc is not rotated regularly to thereby cause a jitter to occur in the reproduction. Further, friction occurs both in the external magnetic field generating coil and the spacer sheet, raising a problem of durability of this kind of magneto-optical disc recording and/or reproducing apparatus.

OBJECTS AND SUMMARY OF THE INVENTION

Accordingly, it is an object of the present invention to provide an improved magneto-optical disc recording and/or reproducing apparatus which can eliminate the aforenoted shortcomings and disadvantages encountered with the prior art.

More specifically, it is an object of the present invention to provide a magneto-optical disc recording and/or reproducing apparatus in which the occurrence of irregular revolution of a magneto-optical disc can be avoided, thereby reducing jitter.

Another object of the present invention is to provide a magneto-optical disc recording and/or reproducing apparatus in which a load on a motor which rotates a magneto-optical disc can be reduced and the power consumption can therefore be reduced.

A further object of the present invention is to provide a magneto-optical disc recording and/or reproducing apparatus in which the service life of a external magnetic field generating coil and a spacer sheet can be prolonged.

As an aspect of the present invention, a magneto-optical disc recording and reproducing apparatus is comprised of an external magnetic field generating means for supplying an external magnetic field to a magneto-optical disc, a spacer sheet disposed relative to the magneto-optical disc at its surface side opposing to the external magnetic field generating means and a moving means for moving the external magnetic field generating means between a first position at which the external magnetic field generating means comes in contact with the magneto-optical disc via the spacer sheet when an information signal is recorded on the magneto-optical disc and a second position distant from the magneto-optical disc when the information signal recorded on the magneto-optical disc is reproduced.

The above, and other objects, features and advantages of the present invention will become apparent in the following detailed description of illustrated embodiments thereof to be read in conjunction with the accompanying drawings, in which like reference numerals are used to identify the same or similar parts in the several views.

BRIEF DESCRIPTION OF THE DRAWINGS

The accompanying drawings show the preferred embodiments of the invention and FIGS. 1 to 6 show a preferred embodiment of the invention wherein:

FIG. 6 is a diagrammatic said view of a section of a main portion of the present invention and illustrating a moving means for making the external magnetic field generating coil contact with or distant from the magneto-optical disc, a coupling means and so on; and FIGS. 7 to 9 show respective modified examples of the moving means wherein:

DETAILED DESCRIPTION OF THE PREFERRED EMBODIMENTS

The magneto-optical disc recording and/or reproducing apparatus according to the present invention will hereinafter be described in detail in accordance with the illustrated embodiment and modified examples.

In the illustrated embodiment, the magneto-optical recording and/or reproducing apparatus of the present invention is used as a magneto-optical disc player which is generally represented by reference numeral 1.

Figure 1:
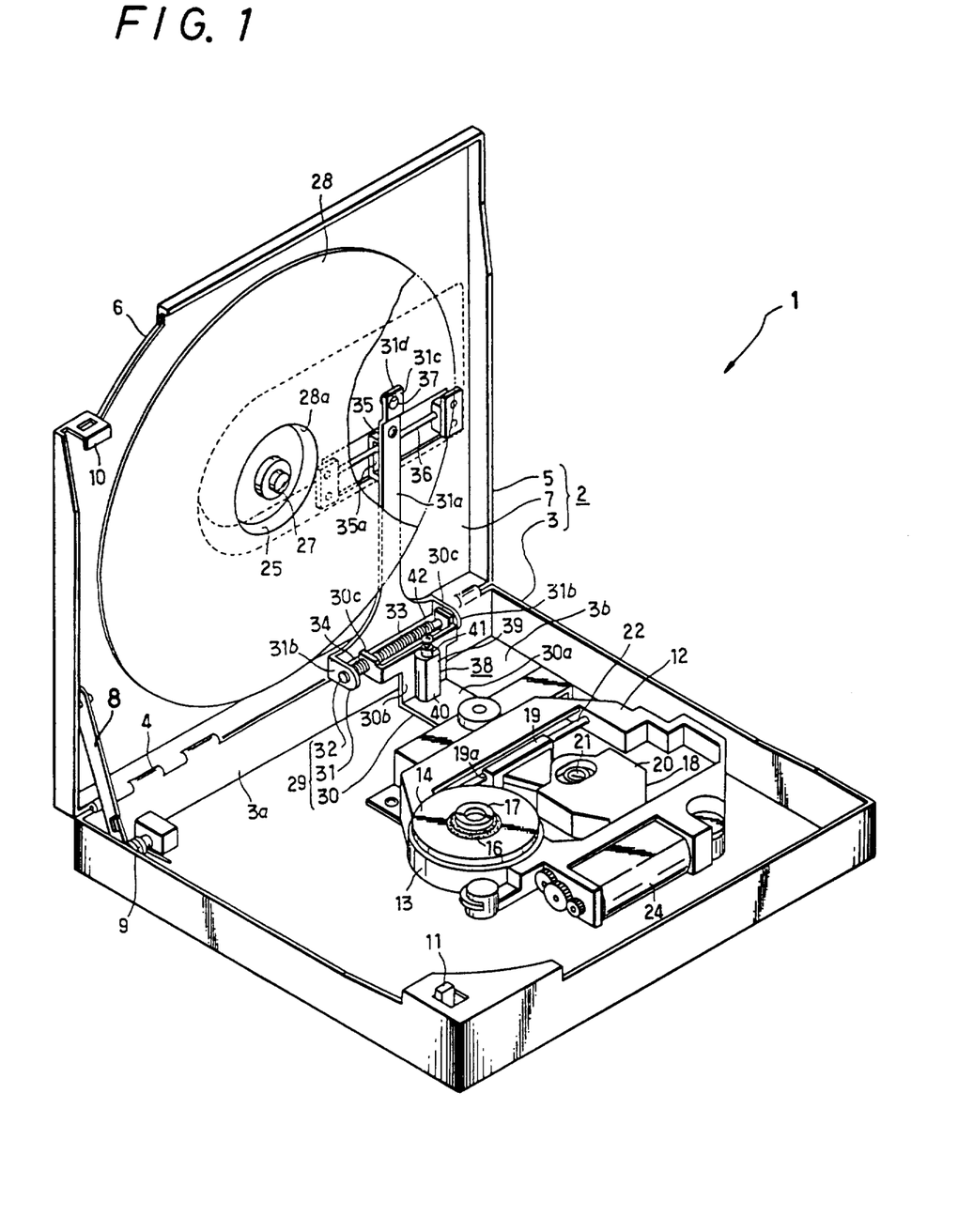
FIG. 1 is a perspective view of an embodiment of a magneto-optical recording and/or reproducing apparatus according to the present invention, and illustrating the condition such that a lid is moved to its opened position.
Figure 2:
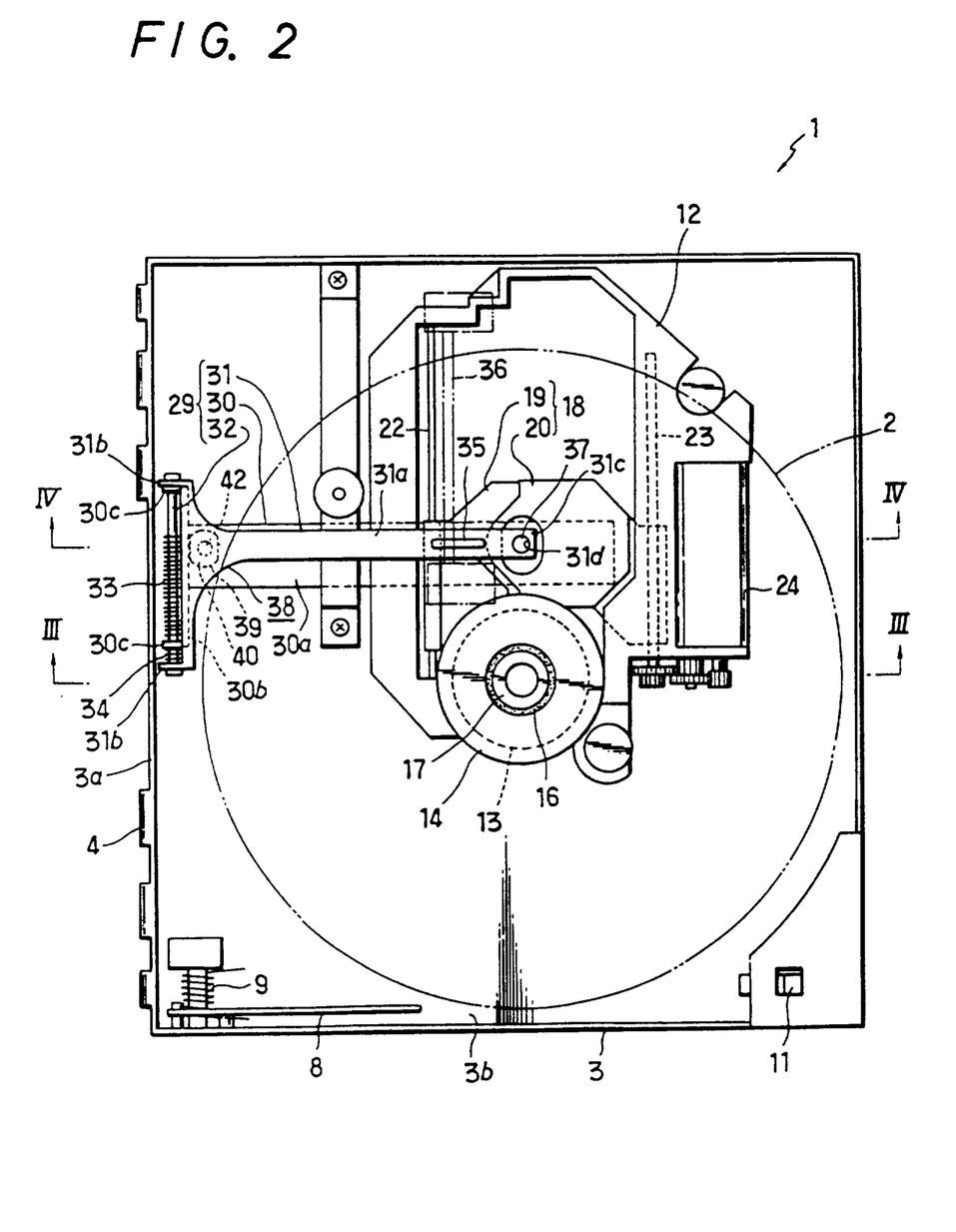
FIG. 2 is a plan view of the embodiment of the magneto-optical disc recording and/or reproducing apparatus according to the present invention, and illustrating the condition such that the lid is removed.
Figure 3:
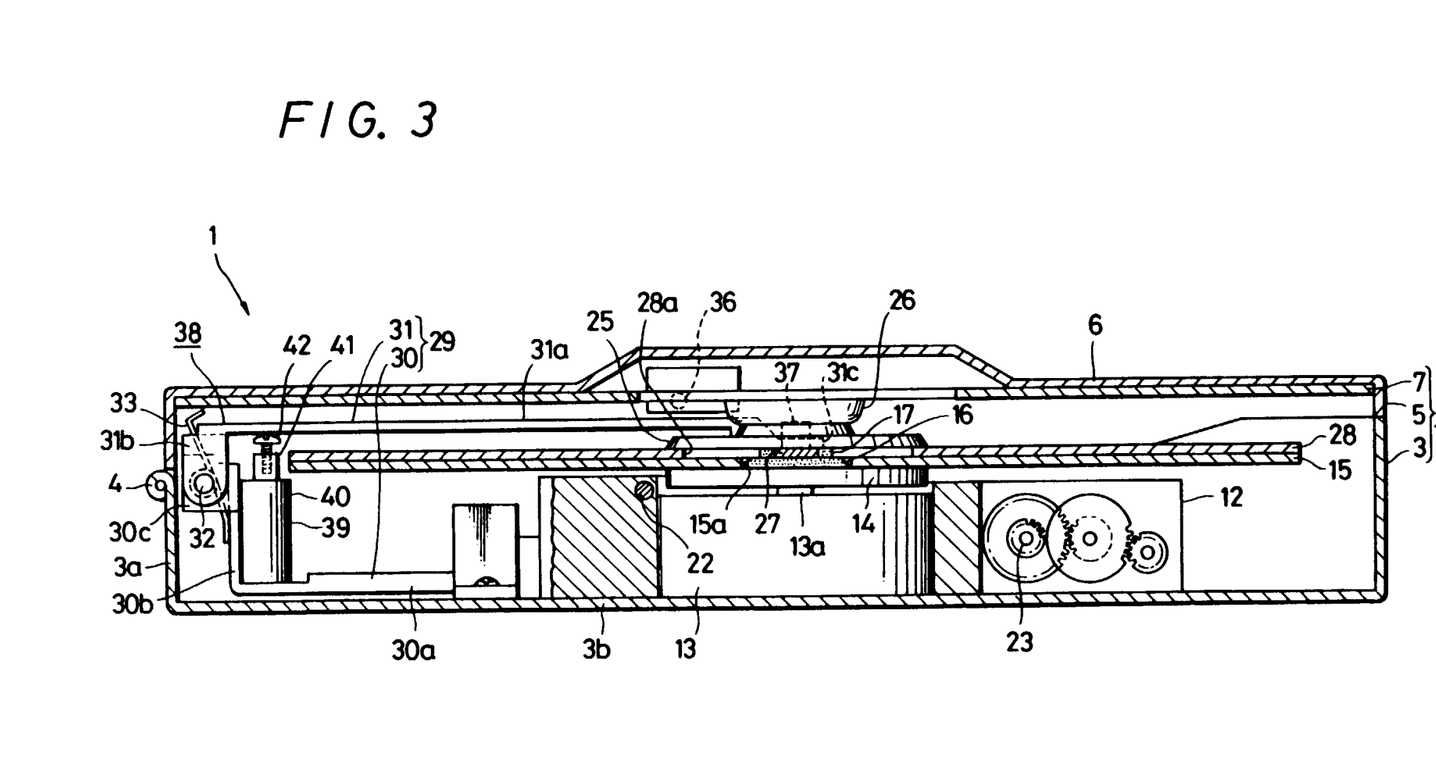
FIG. 3 is an enlarged, vertical cross-sectional view taken through the line III—III of FIG. 2.
Figure 4:
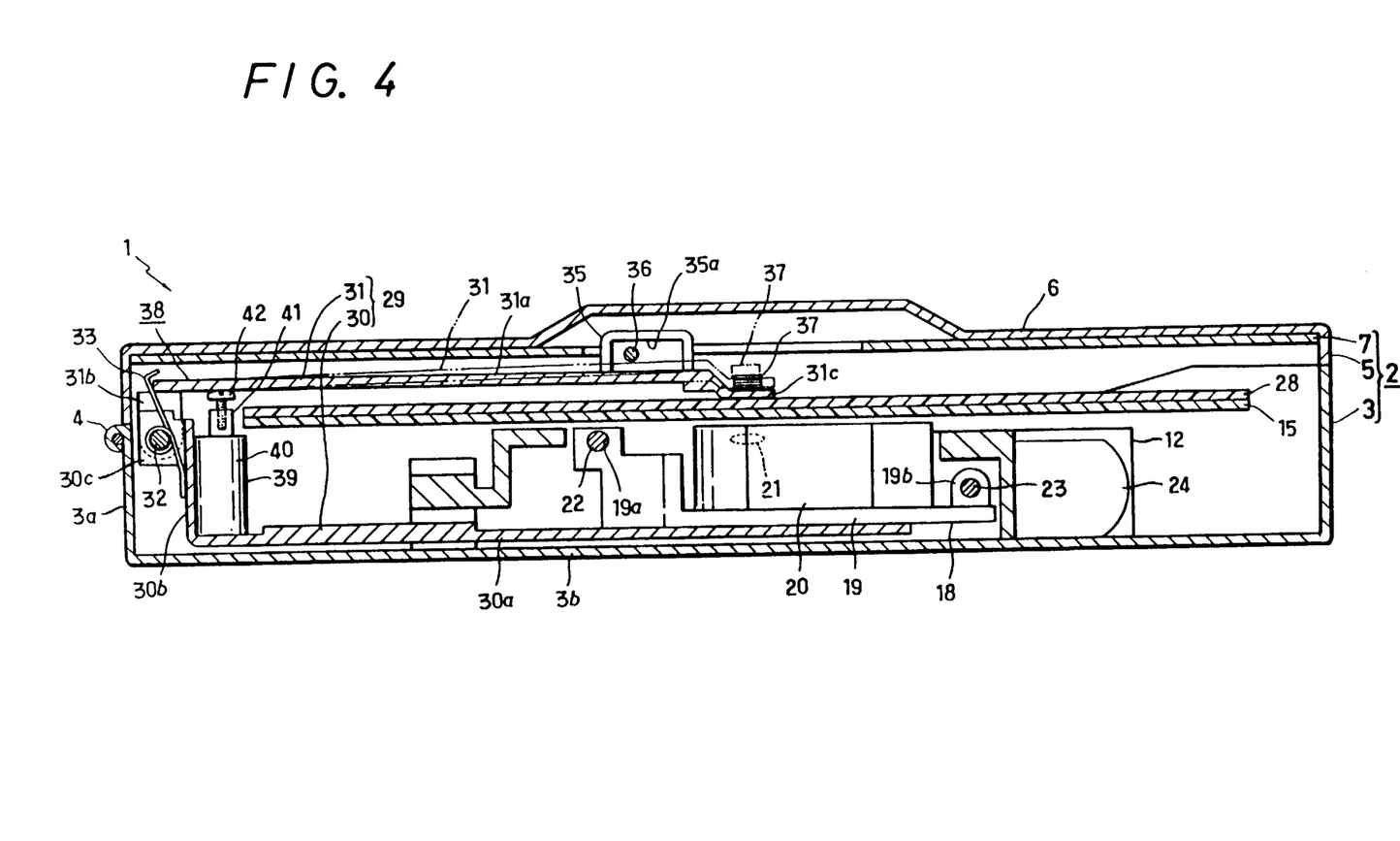
FIG. 4 is an enlarged, vertical cross-sectional view taken through the line IV to IV of FIG. 3.
Figure 5:
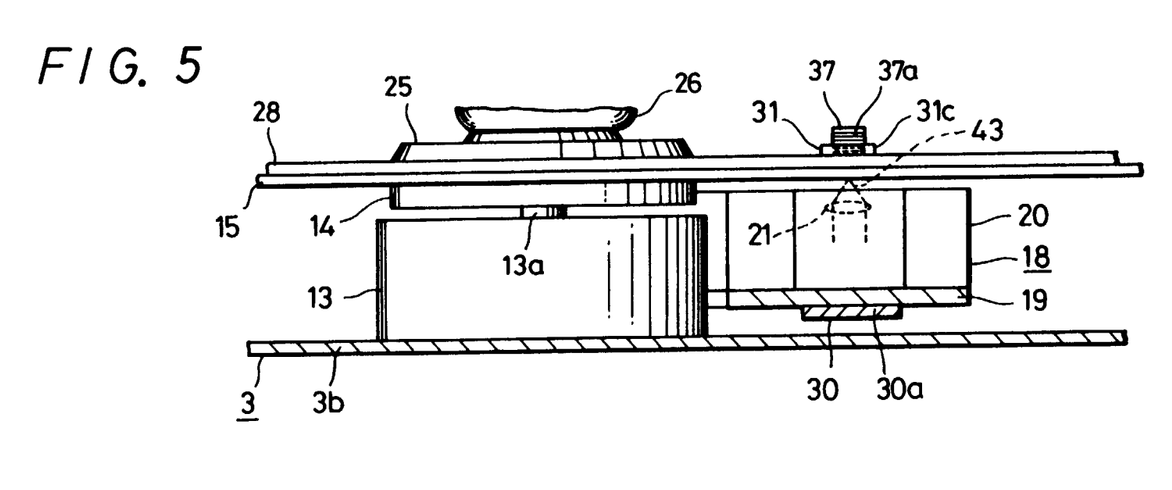
FIG. 5 is a diagrammatic said view of a section of a main portion of the present invention, and illustrating in an enlarged scale the same from the direction perpendicular to the moving direction of the optical pickup.

As illustrated, the magneto-optical disc player 1 has an outer housing 2 and the outer housing 2 is composed of a housing main portion 3 of a shallow box which is shaped substantially as a square and whose upper surface is opened, a lid 5 pivotally supported to a rear side wall 3a of the housing main portion 3 by a hinge means 4, an inside ceiling board 7 stuck to the inner surface of a ceiling plate 6 of the lid 5 so as to cover the whole inner surface of the ceiling plate 6 and so on. In FIG. 1, the rear side assumes the upper left direction, the front side assumes the lower right direction, the left side assumes the lower left direction and the right side assumes the upper right direction, respectively. In the following description, the directions are assumed similarly as described above. Owing to the hinge means 4, the lid 5 can be rotated between its opened position in which it is substantially erected to open the upper surface of the housing main portion 3 as shown in FIG. 1 and its closed position in which it becomes substantially horizontal to close the upper surface of the housing main portion 3.

A lid open lever 8 is spring-biased by a rotational force of a torsion spring 9 and the lid 5 is urged by the lid open lever 8 to rotate toward its opened position, and when the lid 5 is placed in its lid closed position, a locked portion 10 provided in this lid 5 is engaged with a locking member 11 provided on the housing main portion 3, thereby the lid 5 being held in its closed position.

Incidentally, the locked condition by the locking member 11 is released by pushing a lock releasing button not shown.

As illustrated, there is provided a supporting block 12 which supports a motor, an optical pickup or the like which will be described later, and this supporting block 12 is secured to the upper surface of a bottom wall 3b of the housing main portion 3 at its position slightly offset to the right from the center. The supporting block 12 is shaped substantially as a C-letter configuration which opens to the left as seen from above.

A spindle motor 13 is mounted on the bottom wall 3b of the housing main portion 3 at substantially the center of the housing main portion 3 and at the left end portion of the supporting block 12.

A magneto-optical disc 15 is detachably held on a turntable 14, and a central portion of the turntable 14 is secured to the upper end portion of a rotary shaft 13a of the spindle motor 13. The turntable 14 has an annular centering member 16 provided on the upper central portion thereof and a ring-shaped magnet 17 provided within and coaxial with the centering member 16.

An optical pickup 18 is shown to illuminate the magneto-optical disc 15 with a laser beam and to detect a reflected-back light of the laser beam or the like. The optical pickup 18 is movable on a movable base 19 and a casing 20 of the optical pickup 18 is secured on the movable base 19. Within the casing 20, there are disposed a biaxial drive member having an objective lens 21 exposed upwardly and whose optical axis is extended in the vertical direction and an optical block composed of predetermined optical assembly parts, such as a laser beam emitting device, a photo sensor and so on, though not shown.

A columnar guide shaft 22 and a screw shaft 23 are supported at their respective ends to the supporting block 12 so as to extend in parallel to each other along the left and right direction. The guide shaft 22 is slidably inserted into a guided hole 19a bored through the rear end portion of the movable base 19 of the optical pickup 18 and the screw shaft 23 is screwed to a nut portion 19b provided on the front end portion of the movable base 19, whereby the optical pickup 18 are supported by the guide shaft 22 and the screw shaft 23 so as to become movable along the axial direction of the guide shaft 22 and the screw shaft 23.

Incidentally, as seen from above, the objective lens 21 is located on the right of the turntable 14 and the center of the objective lens 21 is located on the straight line passing through the center of the turntable 14 and which extends in the right and left direction. Also, the objective lens 21 is located at the position lower than the upper surface of the turntable 14, i.e., at the position close to the magneto-optical disc 15 held on the turntable 14 upwardly.

A head feed motor 24 is attached to the front end portion of the supporting block 12, and the screw shaft 23 is rotated by this motor 24. Accordingly, when this head feed motor 24 is rotated, the screw shaft 23 is rotated to feed the nut portion 19b, thereby the optical pickup 18 being moved along the axial direction of the guide shaft 22.

A chucking plate 25 is shaped substantially as a circular plate and has a diameter substantially the same as that of the turntable 14. The chucking plate 25 is rotatably supported to a supporting member 26 attached substantially to a lower surface central portion of the inside ceiling plate 7, and an attracted member 27 of substantially flat columnar configuration made of a magnetic material is attached to the inner surface central portion of the chucking plate 25.

Such chucking plate 25 is disposed such that it becomes coaxial with the turntable 14 when the lid 5 is placed at its closed position.

A spacer sheet 28 is made of a material having excellent slipping property, for example, Teflon (trade name). This spacer sheet 28 is shaped as a thin disk and has a diameter substantially the same as that of the magneto-optical disc 15. The spacer sheet 28 has an aperture 28a bored through the central portion thereof, and from this aperture 28a, the attracted member 27 of the chucking plate 25 is faced to the lower direction when the lid 5 is placed at its closed position. The thus arranged spacer sheet 28 is coaxially attached to the chucking plate 25.

Accordingly, the chucking plate 25 and the spacer sheet 28 can be rotated unitarily.

Then, the magneto-optical disc 15 is loaded onto the turntable 14 in such a fashion that, after the magneto-optical disc 15 is loaded on the turntable 14 under the condition that the lid 5 is placed at its lid opened position, then the lid 5 is moved to the closed position. More specifically, when the magneto-optical disc 15 is loaded on the turntable 14, the centering member 16 is inserted into the central aperture 15a of the magneto-optical disc 15, whereby the magneto-optical disc 15 is loaded on the turntable 14 while being centered to the turntable 14. When the lid 5 is moved to its closed position from this condition, the attracted member 27 mounted on the chucking plate 25 is attracted by the magnet 17 on the turntable 14 so that the chucking plate 25 is moved to the turntable 14 side, whereby the magneto-optical disc 15 is held at its central portion by the turntable 14 and the chucking plate 25 and the spacer sheet 28 is brought in close contact with the magneto-optical disc 15 so as to cover the magneto-optical disc 15 at its entire surface of the side opposite to the turntable 14 side.

When the turntable 14 is rotated by the spindle motor 13 after the magneto-optical disc 15 is loaded on the turntable 14 as described above, the magneto-optical disc 15 is rotated so as to become unitary with the chucking plate 25 and the spacer sheet 28.

A connection arm 29 is composed of upper and lower two arms 31 and 30 and a coupling shaft 32 which rotatably connects these two arms as will be described below.

As illustrated, the lower arm 30 is composed of a main member 30a long in the front to rear direction, a member 30b of substantially T-letter configuration erected from the rear end of the main member 30a and supporting members 30c and 30c protruded rearwardly from the left and right ends of the member 30b which are formed as one body by a metal plate. The main member 30a is extended substantially in the horizontal direction and most of the main member 30a is located under the supporting block 12. Also, substantially first half of the main member 30a is secured to the lower surface of the movable base 19 for the optical pickup 18 and the member 30b is located near the rear side wall 3a of the housing main portion 3 so that the lower arm 30 is moved unitarily with the optical pickup 18.

The upper arm 31 is provided in the lid 5 so as to be extended along the inner surface of the inside ceiling plate 7 and in the front to rear direction under the condition such that the lid 5 is placed in its closed condition. This upper arm 31 is located from the right rear end side to the central portion, and is composed of a main member 31a a little longer than the main member 30a of the lower arm 30 and whose most portion is long and slender and whose rear end portion is wide and supporting members 31b, 31b downwardly projected from left and right side edges of the rear end portion of the main member 31a which are unitarily formed by a metal plate. A spacing between the supporting members 31b and 31b is larger than that between the supporting members 30c and 30c of the lower arm 30.

The coupling shaft 32 is supported by the lower arm 30 at its supporting members 30c, 30c inserted into the two respective ends of the coupling shaft 32.

Under the condition that most part of the upper arm 31 except the rear end portion thereof is located between the inside ceiling plate 7 and the spacer sheet 28, the supporting members 31b, 31b of the upper arm 31 are supported by the respective end portions of the coupling shaft 32 across the supporting members 30c, 30c, whereby the upper arm 31 is pivotally supported at the rear end thereof to the rear end portion of the lower arm 30 by the coupling shaft 32.

Incidentally, the supporting members 31b, 31b of the arm 31 are disposed such that most part thereof is located below the spacer sheet 28, thus the spacer sheet 28 and the upper arm 31 being prevented from being brought in contact with each other.

A torsion spring 33 is engaged with the intermediate portion of the coupling shaft 32 from the outside and the upper arm 31 is spring-biased by a spring force of the torsion spring 33 so as to rotate in the clockwise direction as seen from left, whereby an external magnetic field generating coil, which will be described later, supported to the top of the upper arm 31 is resiliently brought in contact with the spacer sheet 28.

A coil spring 34 is contracted between the left supporting members 30c and 31b under the condition that it is engaged with the coupling shaft 32 from the outside. By the spring force of the coil spring 34, the right supporting member 30c of the lower arm 30 and the right supporting member 31b of the upper arm 31 are urged against with each other, whereby the two arms 30 and 31 can be prevented from being unintentionally vibrated in the right and left direction and the two arms 30 and 31 are moved in unison with each other in the right and left direction.

A hook member 35 is shaped as a C-letter configuration which is opened substantially in the lower direction as seen from the right and left direction. This hook member 35 is attached to the upper surface of the upper arm 31 at its position near the rotating end portion 31c to thereby form a rectangular insertion hole 35a extended in the front to rear direction between it and the upper arm 31.

A shaft 36 is attached to the lower surface of the inside ceiling plate 7 at the right position of the chucking plate 25 and extended in the right and left direction so as to be inserted into the above-mentioned insertion hole 35a.

Then, in the arm 31, the hook member 35 is constantly brought in contact with the shaft 36 by the rotational force of the clockwise direction of the torsion spring 33 as seen from left, whereby the upper arm 31 is rotated in substantially unison with the lid 5 to cause the rotating end portion 31c of the upper arm 31 to near or to slightly come in contact with the spacer sheet 28 when the lid 5 is closed.

As shown in FIGS. 1 to 6, an external magnetic field generating coil 37 is formed by winding a wire material 37 around a core (not shown), and attached to the rotating end portion 31c of the upper arm 31 such that the axial direction of the core is extended in the plate thickness direction of the above-mentioned rotating end portion 31c.

An external magnetic field generating coil attaching aperture 31d is bored through the rotating end portion 31c of the upper arm 31. The external magnetic field generating coil 37 is mounted on the upper arm 31 under the condition such that one end portion thereof is inserted into the coil attaching aperture 31d so that, when the lid 5 is placed in its closed position to cause the upper arm 31 to lie in substantially the horizontal direction, the external magnetic field generating coil 37 is located right over the objective lens 21 of the optical pickup 18.

A moving means of this invention will be described with reference to FIGS. 1 to 4 and FIG. 6.

A moving means 38 is adapted to cause the external magnetic field generating means 37 to contact with or to become apart from the spacer sheet 28 under the condition that the lid 5 is placed in its closed position. This moving means 38 is composed of the above-mentioned upper arm 31, a stroke type-electromagnetic plunger, an adjustment screw screwed to a piston rod of the electromagnetic plunger and so on.

In the figures of drawings, reference numeral 39 denotes an electromagnetic plunger, 40 its casing and 41 a piston rod slidably supported to the casing 40. The piston rod 41 is spring-biased by a spring means (not shown) provided within the casing 40 so that the piston rod 41 is constantly urged to project from the casing 40, and when an electromagnetic attracting means (not shown) is excited, the piston rod 41 is pulled into the casing 40.

An adjustment screw 42 is screwed to the piston rod 41 at a top surface of its portion projected from the casing 40.

The moving means 38 is so mounted that it comes in contact with the main member 30a and the erected member 30b of the lower arm 30 under the condition that the axial direction of the electromagnetic plunger 39 is extended along the upper and lower direction and that the adjustment screw 42 is located above.

Thus, since the upper arm 31 is spring-biased by the torsion spring 33 so as to rotate in the clockwise direction as seen from left as earlier noted, under the condition that the lid 5 is in its closed condition, the rear end portion of the upper arm 31 constantly comes in contact with the adjustment screw 42.

Figure 6:
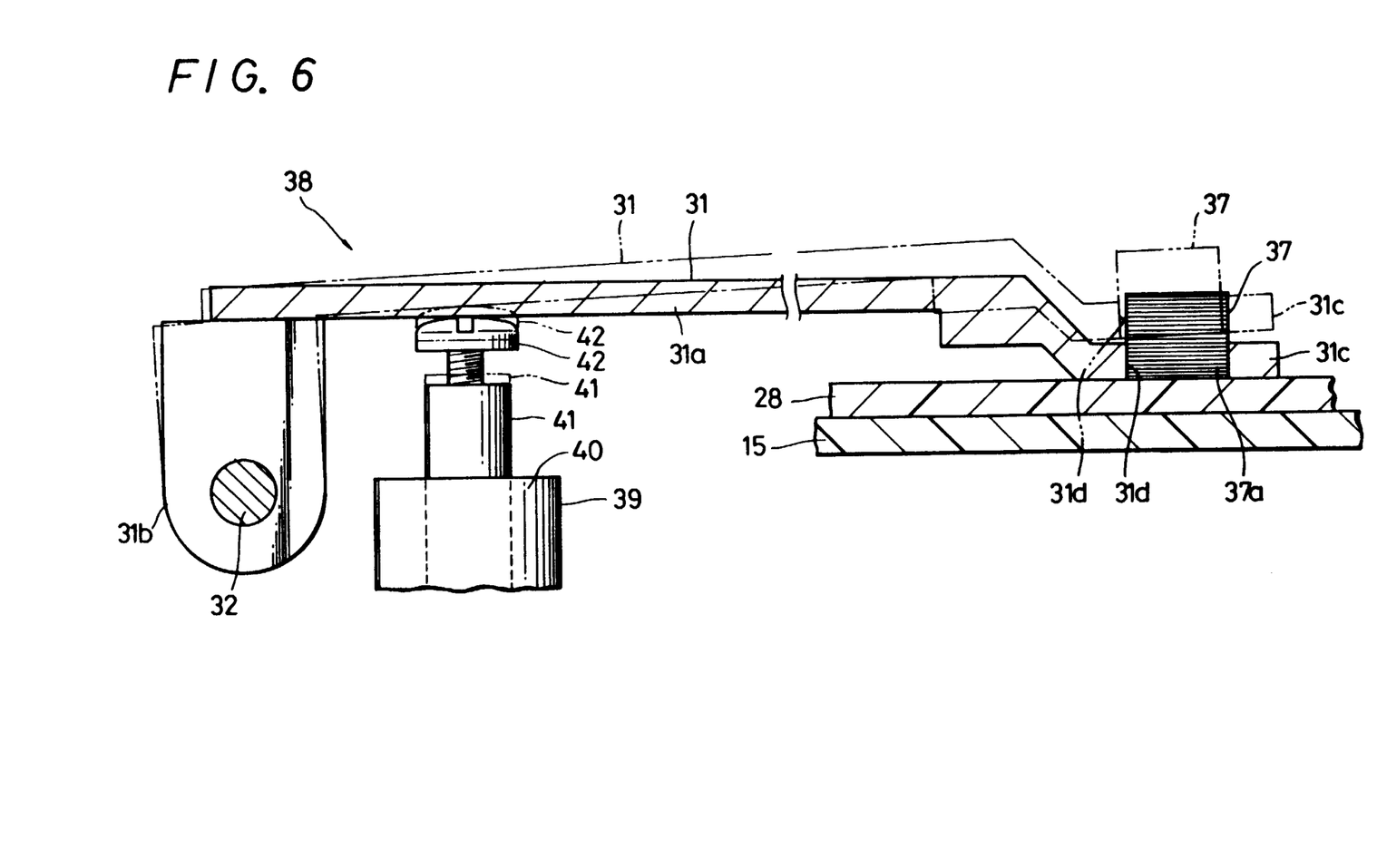

Accordingly, when the electromagnetic plunger 39 is excited, the piston rod 41 is moved downwardly in unison with the adjustment screw 42 to thereby rotate the upper arm 31, which is in contact with the adjustment screw 42, in the clockwise direction by a very small amount with the result that the external magnetic field generating coil 37 supported at the top of the upper arm 31 is moved substantially downwardly, thereby being brought in contact with the spacer sheet 28 as shown by a solid line in FIG. 6.

Incidentally, a signal is recorded on the magneto-optical disc 15 under this condition.

When the electromagnetic plunger 39 is released from being excited, the piston rod 41 is moved upwardly in unison with the adjustment screw 42 to rotate the upper arm 31 in the counter-clockwise direction by a very small amount, whereby the external magnetic field generating coil 37 mounted at the top of the upper arm 31 is moved substantially upwardly, thereby coming apart from the spacer sheet 28 as shown by a two-dot chain line in FIG. 6.

Under this condition, the signal recorded on the magneto-optical disc 15 is read out as will be described later.

Further, the adjustment screw 42 is used to adjust a contact pressure of the external magnetic field generating coil 37 relative to the spacer sheet 28.

More specifically, if the adjustment screw 42 is released from or thrusted into the piston rod 41 to change the projected amount of the screw 42, then the height of the upper arm 31 which contacts with the adjustment screw 42 can be changed when the lid 5 is placed in its closed condition, whereby the height of the external magnetic field generating coil 37 supported to the top of the upper arm 31 can be changed, which in short adjusts the contact pressure of the external magnetic field generating coil 37 relative to the spacer sheet 28.

When a command for effecting the recording of signal is issued, the electromagnetic plunger 39 is excited and the external magnetic field generating coil 37 is brought in contact with the magneto-optical disc 15 across the spacer sheet 28. Also, the turntable 14 is rotated to cause the magneto-optical disc 15 and the spacer sheet 28 to rotate in unison with each other, and a laser beam 43 is illuminated on the magneto-optical disc 15 as a beam spot from the optical pickup 18 through the objective lens 21. Further, the head feed motor 24 is rotated to move the optical pickup 18 to the recording area of the magneto-optical disc 15 at its position corresponding to the recording position.

Then, a current corresponding to the recording signal is supplied to the external magnetic field generating coil 37, thereby a signal magnetic domain being formed in the thin magnetic film of the magneto-optical disc 15.

A signal is recorded on the magneto-optical disc 15 as described above.

When a command for effecting the reproduction of signal is issued, then the electromagnetic plunger 39 is released from being excited and substantially the same operation as that in the recording mode is carried out i.e. the turntable 14 is rotated to cause the magneto-optical disc 15 and the spacer sheet 28 to rotate in unison with each other, the optical pickup 18 illuminates the magneto-optical disc 15 with the laser beam 43 and the optical pickup 18 is moved to the recording area of the magneto-optical disc 15 at its position corresponding to the position from which the signal is to be read out. Then, the optical pickup 18 detects the reflected-back light of the laser beam 43 illuminated on the magneto-optical disc 15 from the optical pickup 18 to thereby read out the signal recorded on the magneto-optical disc 15.

The signal is recorded and/or played back by the magneto-optical disc player 1 as described above. Also, the external magnetic field generating coil 37 comes in contact with the spacer sheet 28 only in the recording mode, and hence upon playback, the external magnetic field generating coil 37 can be prevented from becoming a load to the revolution of the magneto-optical disc 15. Accordingly, the electric power of the spindle motor 13 is consumed efficiently, and the external magnetic field generating coil 37 can be prevented from causing the magneto-optical disc 15 to rotated irregularly.

Figure 7:
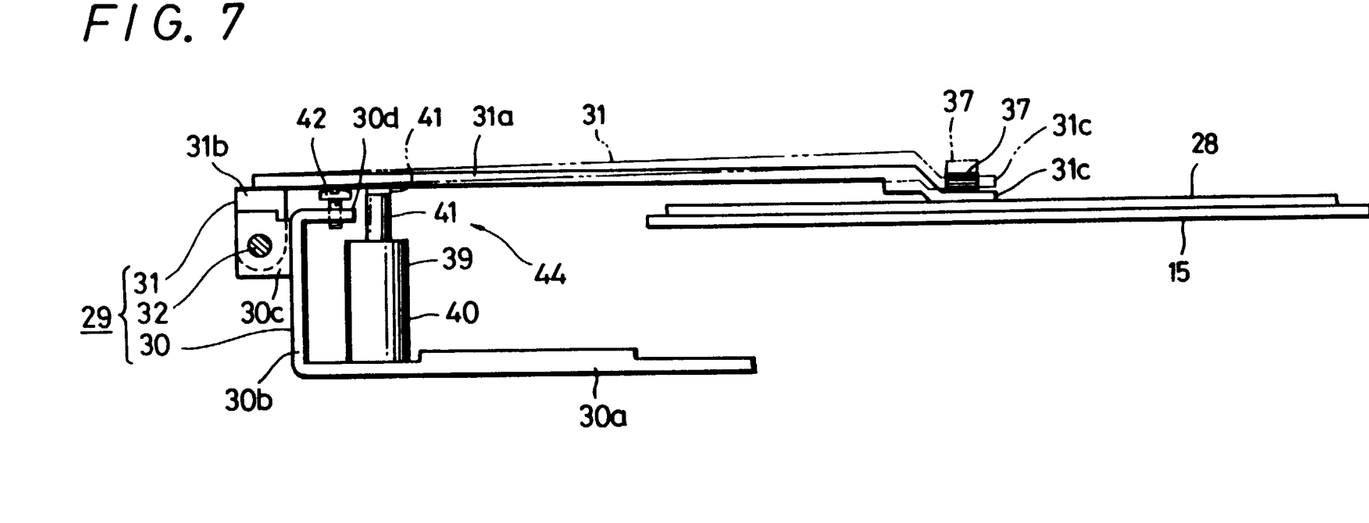
FIG. 7 is a side view of a main portion and illustrating a first modified example of the present invention.
Figure 8:
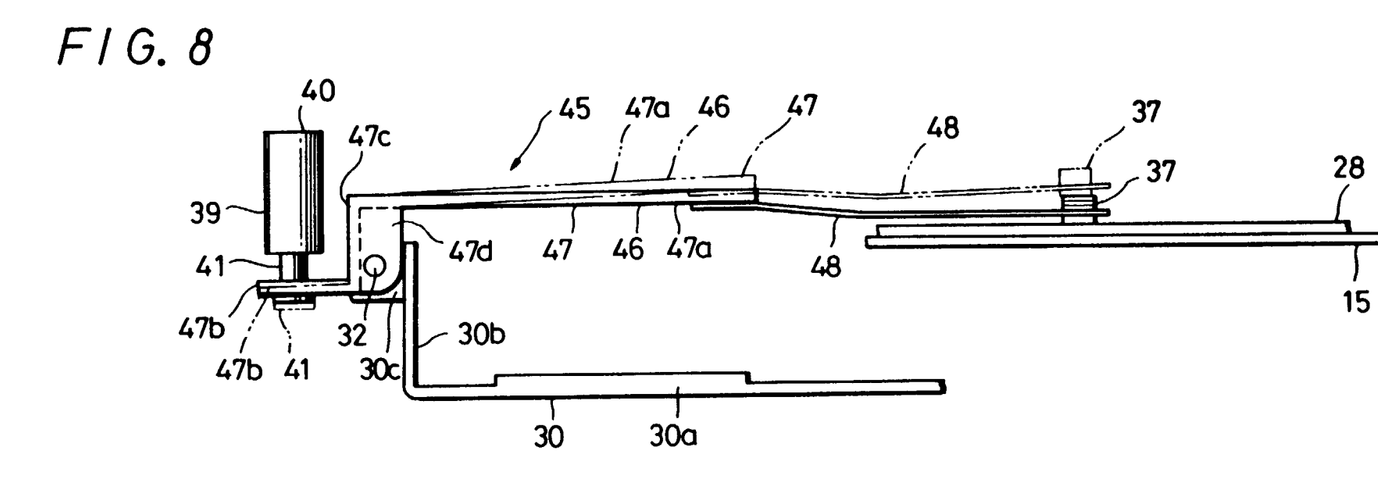
FIG. 8 is a side view of a main portion and illustrating a second modified example of the present invention.
Figure 9:
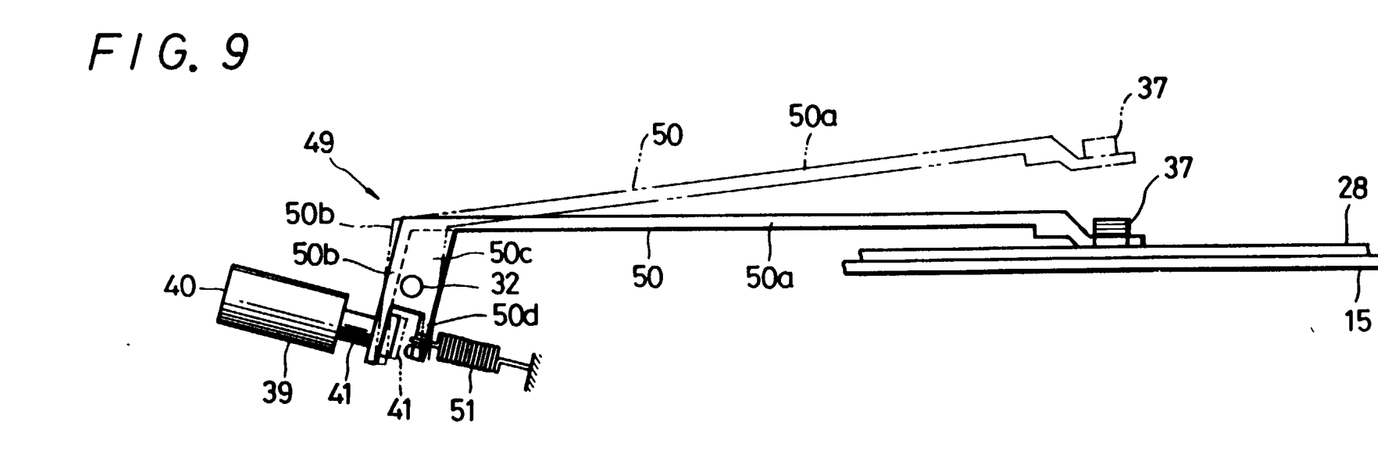
FIG. 9 is a side view of a main portion and illustrating a third modified example of the present invention.

FIGS. 7 to 9 illustrate respective modified examples of the moving means 38.

Of respective portions shown in FIGS. 7 to 9, the same portions in the earlier-noted magneto-optical disc player 1 or the portions having different shapes but having the same function are marked with the same references and therefore need not be described in detail.

FIGS. 7 to 9 show only main portions of the magneto-optical disc player to which the respective modified examples are applied, and those assembly parts may be assembled to the magneto-optical disc player by a variety of means.

FIG. 7 shows a first modified example 44 of the moving means 38.

Referring to FIG. 7, a projected member 30d is projected forward from the top of the erected member 30b of the lower arm 30 and the adjustment screw 42 is screwed to the projected member 30d.

The electromagnetic plunger 39 is mounted on the upper surface of the main member 30a of the lower arm 30 at such a position that the piston rod 41 is located a little ahead of the top of the projected member 30d so that, when the electromagnetic plunger 39 is not excited, the surface of the top of the piston rod 41 is projected upwardly to elevate the upper arm 31, thereby the external magnetic field generating coil 37 being made distant from the spacer sheet 28, whereas when the electromagnetic plunger 39 is excited, then the piston rod 41 is pulled downwardly to lower the upper arm 31, thereby the external magnetic field generating coil 37 being brought in contact with the spacer sheet 28.

FIG. 8 shows a second modified example 45 of the moving means 38.

As shown in FIG. 8, an upper arm 46 is composed of an arm main portion 47 whose rear half portion is bent substantially as a crank as seen from the right and left direction and a plate spring 48 secured to the front end portion of the arm main portion 47.

The arm main portion 47 is composed of a front plate 47a extended forward in substantially the horizontal direction, a rear plate 47b which is spaced apart from the front plate 47a in the upper and lower direction and which is extended rearward from the position in which it becomes coincident with substantially the rear end position of the front plate 47a at the position of the front to rear direction as seen from the planar direction, a coupling plate 47c for coupling the rear end of the front plate 47a and the front end of the rear plate 47b and which is substantially perpendicular to these front and rear plates 47a and 47b and supporting members 47d, 47d (only one supporting member 47d is shown in FIG. 8) projected forward from the left and right side edges of the coupling plate 47. The supporting members 47d, 47d are supported by the coupling shaft 32, and the upper arm 46 is coupled to the lower arm 30 so as to become freely rotatable.

The plate spring 48 has substantially the same width as that of the front plate 47a of the arm main portion 47, and is supported on the lower surface of the front end portion of the arm main portion 47 so as to be elongated forward from the front end edge of the arm main portion 47. The external magnetic field generating coil 37 is attached to the top portion of the plate spring 48.

The electromagnetic plunger 39 is disposed above the rear plate 47b of the arm main portion 47 and the top portion of the piston rod 41 of the electromagnetic plunger 39 is coupled to the rear end of the rear plate 47b of the arm main portion 47 so that, when the electromagnetic plunger 39 is not excited, the piston rod 41 is projected downwardly to rotate the upper arm 46 in the counter-clockwise direction as shown by a two-dot chain line in FIG. 8, thereby the external magnetic generating coil 37 being spaced apart from the spacer sheet 28, whereas when the electromagnetic plunger 39 is excited, then the piston rod 41 is pulled upwardly to rotate the upper arm 46 in the clockwise direction as shown by a solid line in FIG. 8, thereby the external magnetic field generating coil 37 being brought in contact with the spacer sheet 28. When the external magnetic field generating coil 37 is brought in contact with the spacer sheet 28 by the excitation of the electromagnetic plunger 39, the plate spring 48 is flexed to generate a spring force by which the external magnetic field generating coil 37 is brought in resilient contact with the spacer sheet 28.

FIG. 9 shows a third modified example 49 of the moving means 38.

As shown in FIG. 9, an upper arm 50 is composed of a main member 50a having substantially the same length as that of the main member 31a of the above-mentioned upper arm 31, a coupling member 50b projected downward from the rear end edge of the main member 50a to a slightly rear oblique direction and supporting members 50c, 50c projected from left and right side edges of the upper half portion of the coupling member 50b to the front direction (only one supporting member 50c is shown in FIG. 9). The supporting members 50c, 50c are supported by the coupling shaft 32, the upper arm 50 is pivotally coupled to the lower arm 30, and the external magnetic field generating coil 37 is attached to the rotating end portion of the main member 50a.

The electromagnetic plunger 39 is disposed at the rear side of the coupling member 50b in such a position that the piston rod 41 thereof is moved in the direction substantially perpendicular to the plane direction of the rear surface of the coupling member 50b of the upper arm 50. The top portion of the piston rod 41 is coupled to the coupling member 50b of the upper arm 50.

A tension spring 51 is disposed in front of the coupling member 50b of the upper arm 50 and extended between a spring hook member 50d projected from the front lower end edge of one supporting member 50c to the lower direction and a spring hook member formed on the lower arm 30 (not shown) to thereby spring-bias the upper arm 50 so as to rotate in the counter-clockwise direction.

Thus, when the electromagnetic plunger 39 is not excited, the upper arm 50 is rotated by the tension of the tension spring 51 in the counter-clockwise direction as shown by a two-dot chain line in FIG. 9, thereby the external magnetic field generating coil 37 being spaced apart from the spacer sheet 28, while when the electromagnetic plunger 39 is excited, then the piston rod 41 is pulled into the casing 40 to rotate the upper arm 50 in the clockwise direction again the tension of the tension spring 51, thereby the external magnetic field generating coil 37 being brought in contact with the spacer sheet 28.

As is clear from the above description, the present invention relates to the magneto-optical disc recording and/or reproducing apparatus in which, when the magneto-optical disc is chucked to the turntable, the magneto-optical disc is covered at its entire surface opposing to the external magnetic field generating coil by the spacer sheet. One of the most specific features of the magneto-optical recording and/or reproducing apparatus lies in that the moving means is provided to move the external magnetic field generating coil in the direction spaced apart from or in contact with the magneto-optical disc. Upon recording, the external magnetic field generating coil is brought in contact with the magneto-optical disc across the spacer sheet, whereas upon reproduction, the external magnetic field generating coil is spaced apart from the spacer sheet.

Therefore, according to the magneto-optical disc recording and/or reproducing apparatus of the present invention, since the external magnetic field generating coil can be prevented from being a load on the revolution of the magneto-optical disc in the reproduction mode, the occurrence of irregular revolution of the magneto-optical disc by the external magnetic field generating coil in the playback mode can be avoided, and hence the jitter can be reduced. Also, the load of the motor which rotates the magneto-optical disc can be reduced and the power consumption can be reduced. Further, the wearing of the external magnetic field generating coil and the spacer sheet can be reduced and the service life of the external magnetic field generating coil and the spacer sheet can be prolonged.

While in the above-mentioned embodiment the electromagnetic plunger is utilized as the moving means for causing the external magnetic field generating coil to be brought in contact with or to be spaced apart from the magneto-optical disc across the spacer sheet and the electromagnetic plunger is excited by the recording operation command to thereby cause the external magnetic field generating coil to come in contact with the magneto-optical disc, this moving means may be modified as such a construction that can be operated in a manual fashion.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A magneto-optical disc recording and reproducing apparatus comprising:
   (a) an optical recording and reproducing head for recording and reproducing signals on a magneto-optical disc;
   (b) external magnetic field generating means for supplying an external magnetic field to the magneto-optical recording and reproducing head is recording signals on the magneto-optical disc;
   (c) a spacer sheet disposed relative to the magneto-optical disc at its surface side opposing to the external magnetic field generating means;
   (d) wherein the external magnetic field generating means is movable and is positioned at a first position which is distant from the magneto-optical disc and the spacer sheet when the optical recording and reproducing head is reproducing signals from the magneto-optical disc and at a second position at which the external magnetic field generating means comes in contact with the magneto-optical disc via the spacer sheet when the optical recording and reproducing head is recording signals on the magneto-optical disc; and
   (e) moving means for moving the external magnetic field generating means between the first position and the second position and keeping the external magnetic field generating means distant from the magneto-optical disc and the spacer sheet when the information signal recorded on the magneto-optical disc is reproduced.

2. A magneto-optical disc recording and reproducing apparatus according to claim 1, wherein the external magnetic field generating means is unitarily coupled to the optical recording and reproducing head disposed across the magneto-optical disc and can be freely moved in the radial direction of the magneto-optical disc in unison with the optical recording and reproducing head.

3. A magneto-optical disc recording and reproducing apparatus according to claim 2, wherein the moving means is disposed so as to become movable in the radial direction of the magneto-optical disc in unison with the external magnetic field generating means.

4. A magneto-optical disc recording and reproducing apparatus according to claim 1, wherein the external magnetic field generating means is comprised of a pivotally mounted arm member and an external magnetic field generating unit provided on a free end side of the arm member and wherein the arm member raises and lowers the magnetic field generating means relative to the spacer sheet.

5. A magneto-optical disc recording and reproducing apparatus comprising:
   (a) an optical head for recording signals on a magneto-optical disc and reproducing signals from the magneto-optical disc;
   (b) external magnetic field generating means for supplying an external magnetic field to the magneto-optical disc whereby signals are recorded on the magneto-optical disc by the external magnetic field generating means and the optical head, the external magnetic field generating means being arranged on one side of the magneto-optical disc which is opposite to the optical head and wherein the external magnetic field generating means is positioned coaxially with respect to the optical head;

(c) spacer means for generating a distance between the magneto-optical disc and the external magnetic field generating means, the spacer means being provided on a surface of the one side of the magneto-optical disc, the spacer means being contacted by the external magnetic field generating means;

(d) wherein the external magnetic field generating means is movable and is positioned at a first position which is distant from the magneto-optical disc and the spacer means when the optical head is reproducing signals from the magneto-optical disc and at a second position at which the external magnetic field generating means comes in contact with the magneto-optical disc via the spacer means when signals are being recorded on the magneto-optical disc;

(e) an arm member for supporting the external magnetic field generating means, the arm member being movable between the first position and the second position; and (f) moving means for moving the arm member between the first position and the second position and keeping the external magnetic field generating means distant from the magneto-optical disc and the spacer means when the signals recorded on the magneto-optical disc are reproduced.

* * * * *